(12) United States Patent
Kim (10) Patent No.: US 12,203,856 B2
(45) Date of Patent: Jan. 21, 2025

(54) FLUORESCENCE GENERATING DEVICE AND DIGITAL POLYMERASE CHAIN REACTION ANALYSIS SYSTEM INCLUDING THE SAME

(71) Applicant: ELECTRONICS AND TELECOMMUNICATIONS RESEARCH INSTITUTE, Daejeon (KR)

(72) Inventor: Jin Tae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 360 days.

(21) Appl. No.: 17/470,787

(22) Filed: Sep. 9, 2021

(65) Prior Publication Data

US 2022/0228984 A1    Jul. 21, 2022

(30) Foreign Application Priority Data

Jan. 20, 2021  (KR) .................. 10-2021-0007997
Apr. 30, 2021  (KR) .................. 10-2021-0056175

(51) Int. Cl.
*G01N 21/64* (2006.01)
*B01L 3/00* (2006.01)
(Continued)

(52) U.S. Cl.
CPC .......... *G01N 21/645* (2013.01); *B01L 3/502* (2013.01); *G01N 21/6428* (2013.01);
(Continued)

(58) Field of Classification Search
None
See application file for complete search history.

(56) References Cited

U.S. PATENT DOCUMENTS 7,844,156 B2    11/2010  Ohtsu et al.
10,101,274 B2   10/2018  Lemieux et al.
(Continued)

FOREIGN PATENT DOCUMENTS

JP    2009-145867 A    7/2009
JP    2010-26444 A     2/2010
(Continued)

OTHER PUBLICATIONS

Paschotta retrived from https://doi.org/10.61835/1un in 2023 (Year: 2023).*

(Continued)

*Primary Examiner* — Matthew D Krcha
*Assistant Examiner* — Brittany I Fisher (57) ABSTRACT

Provided are a fluorescence generating device and a digital PCR analysis system including the same. The fluorescence generating device includes a clad layer on a substrate, an optical waveguide arranged in a first direction within the clad layer, and a housing which is disposed on the optical waveguide and the clad layer and has a micro fluid channel extending in a second direction. The optical waveguide includes an input waveguide which is provided within one side of the clad layer and provides excitation light to a liquid drop within the micro fluid channel to generate fluorescent light, and an output waveguide which is provided within the other side of the clad layer and has an output inclined surface that reflects the fluorescent light.

17 Claims, 8 Drawing Sheets

(51) Int. Cl.
    *G02B 6/293*     (2006.01)
    *G02B 6/42*     (2006.01)

(52) U.S. Cl.
    CPC ...... *G02B 6/4215* (2013.01); *B01L 2200/025* (2013.01); *B01L 2200/0673* (2013.01); *B01L 2300/0654* (2013.01); *B01L 2300/0663* (2013.01); *B01L 2300/0681* (2013.01); *B01L 2300/0816* (2013.01); *B01L 2300/0845* (2013.01); *B01L 2300/0858* (2013.01); *B01L 2300/168* (2013.01); *G01N 2021/6471* (2013.01)

(56) References Cited

U.S. PATENT DOCUMENTS

| | | |
|---|---|---|
| 11,808,704 B2 | 11/2023 | Gervais et al. |
| 2004/0062468 A1 | 4/2004 | Lee |
| 2005/0068536 A1* | 3/2005 | Schwabe ............ G01N 21/6428 356/436 |
| 2006/0129210 A1* | 6/2006 | Cantin ................ A61N 5/0622 607/88 |
| 2008/0131956 A1 | 6/2008 | Chung et al. |
| 2010/0021109 A1* | 1/2010 | Ohtsu ................ G02B 6/4214 385/129 |
| 2010/0220315 A1* | 9/2010 | Morrell ............ G01N 15/1436 356/73 |
| 2013/0034857 A1* | 2/2013 | Kajihara ............ G01N 21/6452 435/6.12 |
| 2014/0223506 A1 | 8/2014 | Ahn et al. |
| 2017/0016827 A1* | 1/2017 | Gervais ................ G01N 21/648 |
| 2021/0121886 A1 | 4/2021 | Lee et al. |

FOREIGN PATENT DOCUMENTS

| | | |
|---|---|---|
| JP | 2016-502670 A | 1/2016 |
| JP | 2017-512306 A | 5/2017 |
| KR | 102016131 B1 | 10/2019 |
| WO | 2019/226679 A1 | 11/2019 |

OTHER PUBLICATIONS

Feng Guo et al., "A Droplet-Based, Optofluidic Device for High-Throughput, Quantitative Bioanalysis", The Pennsylvania State University, Anal. Chem. 2012, 84, 10745-10749, Nov. 9, 2012.

Linal Mazutis, et al., "Multi-step microfluidic droplet processing: kinetic analysis of an in vitro translated enzyme", Lab Chip, 2009, 9, 2902-2908, Universite de Strasbourg, Aug. 2009.

* cited by examiner

FLUORESCENCE GENERATING DEVICE AND DIGITAL POLYMERASE CHAIN REACTION ANALYSIS SYSTEM INCLUDING THE SAME

CROSS-REFERENCE TO RELATED APPLICATIONS

This U.S. non-provisional patent application claims priority under 35 U.S.C. § 119 of Korean Patent Application Nos. 10-2021-0007997, filed on Jan. 20, 2021, and 10-2021-0056175, filed on Apr. 30, 2021, the entire contents of which are hereby incorporated by reference.

BACKGROUND

The present disclosure herein relates to an analysis system, and particularly, to a fluorescence generating device and a digital polymerase chain reaction (PCR) analysis system including the same.

Recently, the incidence of high-risk infectious diseases is spreading and becoming prevalent due to social culture and economic factors, and huge national, social, and economic losses are being caused by the incidence of a malignant tumor and the occurrence of various types of cancers. There is an increased need to develop techniques for rapidly and accurately reading pathogens such as high-risk viruses and bacteria.

SUMMARY

The present disclosure provides: a fluorescence generating device capable of enhancing fluorescence detection efficiency of a liquid drop for digital PCR; and a digital PCR analysis system including the same.

Disclosed is a fluorescence generating device. An embodiment of the inventive concept provides a fluorescence generating device including: a clad layer on a substrate; an optical waveguide disposed within the clad layer and arranged in a first direction; and a housing disposed on the optical waveguide and the clad layer, the housing having a micro fluid channel extending in a second direction crossing the first direction. Here, the optical waveguide may include: an input waveguide which is provided within one side of the clad layer and provides excitation light to a liquid drop within the micro fluid channel to generate fluorescent light; and an output waveguide provided within the other side of the clad layer, the output waveguide having an output inclined surface disposed between the micro fluid channel and the clad layer to reflect the fluorescent light.

In an embodiment, the input waveguide may be disposed below the micro fluid channel, the input waveguide having an input inclined surface disposed between the micro fluid channel and the clad layer to reflect the excitation light to the liquid drop within the micro fluid channel.

In an embodiment, the fluorescence generating device may further include a reflection layer which is disposed between the input and output inclined surfaces and the clad layer.

In an embodiment, the reflection layer may include: an input reflection layer below the input inclined surface; and an output reflection layer below the output inclined surface.

In an embodiment, the output reflection layer may include a dichroic filter.

In an embodiment, the fluorescence generating device may further include a fluorescent light filter which is provided within the micro fluid channel above the input inclined surface.

In an embodiment, the input waveguide may be connected to a side wall of the micro fluid channel.

In an embodiment, the fluorescent light filter may be provided at an end of the input waveguide that is in contact with the side wall of the micro fluid channel.

In an embodiment, the fluorescence generating device may further include an excitation light filter which is provided within the micro fluid channel above the output inclined surface.

In an embodiment, the optical waveguide may include a ridge-type waveguide.

In an embodiment of the inventive concept, a fluorescence generating device includes: a clad layer on a substrate; an input waveguide provided on one side of the clad layer, the input waveguide having an input inclined surface; an output waveguide provided on the other side of the clad layer, the output waveguide having an output inclined surface adjacent to the input inclined surface; a fluid chip disposed above the input inclined surface and the output inclined surface, the fluid chip having a micro fluid channel that accommodates oil and a liquid drop within the oil; an excitation light filter disposed within the micro fluid channel above the output inclined surface to remove excitation light provided to the liquid drop; and an fluorescent light filter disposed within the micro fluid channel adjacent to the input waveguide to remove fluorescent light discharged from the liquid drop by the excitation light.

In an embodiment, the input waveguide may be connected to a side wall on one side of the micro fluid channel.

In an embodiment, the excitation light filter and the fluorescent light filter may be disposed in an L-shape.

In an embodiment, the clad layer may be provided at a side wall on the other side of the micro fluid channel.

In an embodiment, the fluorescence generating device may further include a reflection layer provided between the input and output inclined surfaces and the clad layer.

In an embodiment of the inventive concept, a digital PCR analysis system includes: a light source device comprising an exciting light source configured to generate excitation light; a fluorescence generating device configured to receive the excitation light to generate fluorescent light of a liquid drop; and a detection device provided with a photo-detector configured to detect the fluorescent light. Here, the fluorescence generating device may include: a clad layer on a substrate; an optical waveguide disposed within the clad layer and arranged in a first direction; and a housing disposed on the optical waveguide and the clad layer, the housing having a micro fluid channel that extends in a second direction crossing the first direction. Here, the optical waveguide may include: an input waveguide provided within one side of the clad layer, the input waveguide providing the excitation light to the liquid drop within the micro fluid channel to generate the fluorescent light; and an output waveguide provided within the other side of the clad layer, the output waveguide having an output inclined surface that is disposed between the micro fluid channel and the clad layer to reflect the fluorescent light.

In an embodiment, the light source device may further include a first optical transmission block provided between the exciting light source and the fluorescence generating device. The first optical transmission block may further include: a first cladding block; a first buried waveguide disposed within the first cladding block, the first buried waveguide delivering the excitation light to the fluorescence generating device; and a first dichroic mirror provided in the first buried waveguide, first dichroic mirror transmitting the excitation light and reflecting the fluorescent light.

In an embodiment, the detection device may further include a second optical transmission block provided between the photo-detector and the fluorescence generating device. The second optical transmission block may include: a second cladding block; a second buried waveguide disposed within the second cladding block, the second buried waveguide providing the fluorescent light to the photo-detector; and a second dichroic mirror provided in the second buried waveguide, the second dichroic mirror transmitting the fluorescent light and reflecting the excitation light.

In an embodiment, the light source device may further include a first lens provided between the exciting light source and the fluorescence generating device, and the detection device may further include a second lens between the fluorescence generating device and the photo-detector.

In an embodiment, the light source device may further include a first optical fiber between the exciting light source and the fluorescence generating device, and the detection device may further include a second optical fiber between the fluorescence generating device and the photo-detector.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the inventive concept will be described in detail with reference to the accompanying drawings. Advantages and features of the present disclosure, and implementation methods thereof will be clarified through following embodiments described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the concept of the present disclosure to those skilled in the art. Further, the present disclosure is only defined by scopes of claims. Like reference numerals refer to like elements throughout.

The terms used in this specification are used only for explaining embodiments while not limiting the present disclosure. In this specification, the singular forms include the plural forms as well, unless the context clearly indicates otherwise. The meaning of 'comprises' and/or 'comprising' used in the specification does not exclude the presence or addition of one or more components, steps, operations, and/or elements other than the mentioned components, steps, operations, and/or devices. Also, in the specification, polymerase chain reaction (PCR), a droplet, and a capsule may be understood as having meanings mainly used in the field of biotechnology. Since preferred embodiments are provided below, the order of the reference numerals given in the description is not limited thereto.

The foregoing description is about detailed examples for practicing the inventive concept. The present disclosure includes not only the above-described embodiments but also simply changed or easily modified embodiments. In addition, the present disclosure may include techniques which may be easily modified and practiced by using the embodiments described above.

Figure 1:
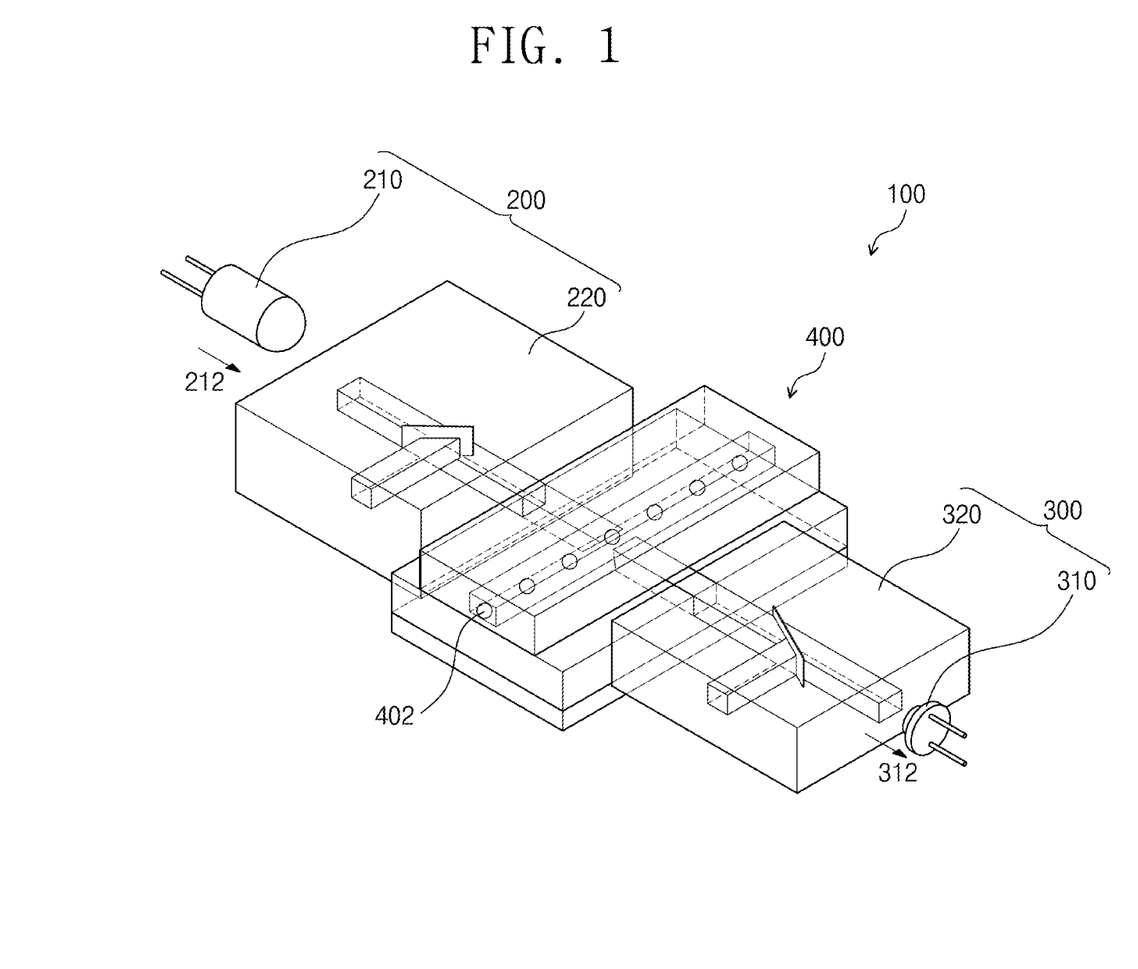
FIG. 1 is a perspective view showing an example of a digital PCR analysis system according to an embodiment of the inventive concept.

FIG. 1 shows an example of a digital PCR analysis system 100 according to an embodiment of the inventive concept.

Referring to FIG. 1, the digital PCR analysis system 100 according to the embodiment of the inventive concept may include a light source device 200, a detection device 300, and a fluorescence generating device 400. The light source device 200 may provide excitation light 212 to a liquid drop 402 within the fluorescence generating device 400, and may generate fluorescent light 312. The detection device 300 may detect the fluorescent light 312 of the fluorescence generating device 400. The fluorescence generating device 400 may be provided between the light source device 200 and the detection device 300. The liquid drop 402 within the fluorescence generating device 400 may receive the excitation light 212 and discharge the fluorescent light 312. The control unit (not shown) may distinguish and/or discriminate the types of DNA of the liquid drop 402 within the fluorescence generating device 400 by using a fluorescence detection signal of the detection device 300.

Figure 2:
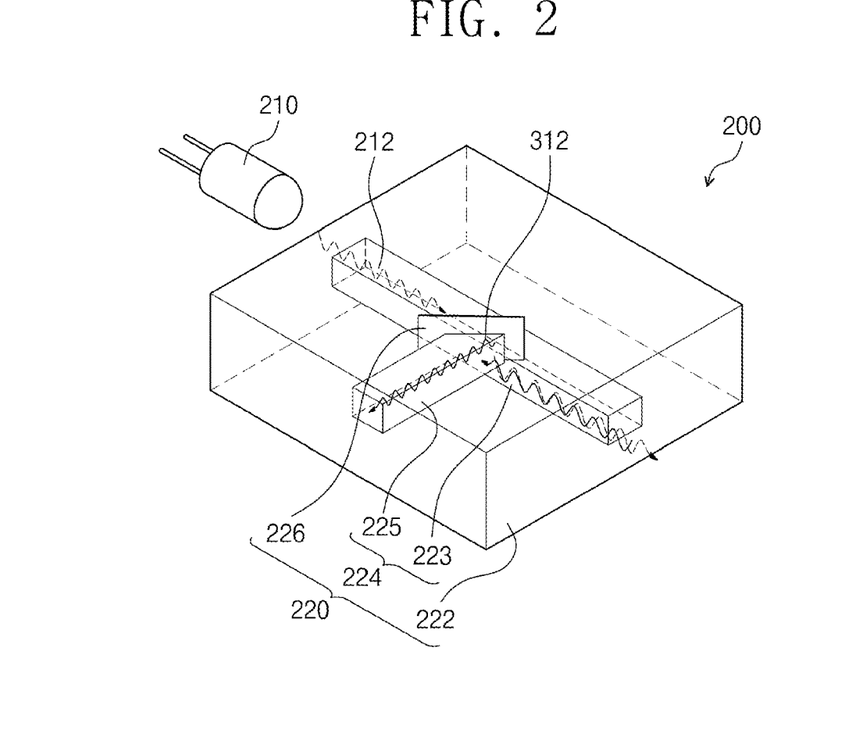
FIG. 2 is a perspective view showing an example of a light source device of FIG. 1.

FIG. 2 shows an example of the light source device 200 of FIG. 1.

Referring to FIGS. 1 and 2, the light source device 200 may include an exciting light source 210 and a first optical transmission block 220.

The exciting light source 210 may generate the excitation light 212. For example, the exciting light source 210 may include a light emitting diode. The excitation light 212 may include blue light of about 488 nm.

The first optical transmission block 220 may be provided between the exciting light source 210 and the fluorescence generating device 400. The first optical transmission block 220 may transmit the excitation light 212 to the fluorescence generating device 400. The first optical transmission block 220 may remove the fluorescent light 312 of the fluorescence generating device 400 and protect the exciting light source 210. As one example, the first optical transmission block 220 may include a first cladding block 222, a first buried waveguide 224, and a first dichroic mirror 226.

The first cladding block 222 may be provided between the exciting light source 210 and the fluorescence generating device 400. The first cladding block 222 may include a silicon oxide. On the other hand, the first cladding block 222 may include a transparent polymer, but the embodiment of the inventive concept is not limited thereto.

The first buried waveguide 224 may be provided within the first cladding block 222. The first buried waveguide 224 may be connected between the exciting light source 210 and the fluorescence generating device 400. The first buried waveguide 224 may have a refractive index higher than a refractive index of the first cladding block 222. For example, the first buried waveguide 224 may include silicon. The first buried waveguide 224 may deliver the excitation light 212 to the fluorescence generating device 400. As one example, the first buried waveguide 224 may include a first main waveguide 223 and a first branch waveguide 225. The first main waveguide 223 may extend from one side of the first cladding block 222 to the other side thereof. That is, the first main waveguide 223 may connect the exciting light source 210 to the fluorescence generating device 400. The first main waveguide 223 may provide the excitation light 212 to the fluorescence generating device 400. The first branch waveguide 225 may be branched from the first main waveguide 223. The first branch waveguide 225 may have a direction different from a direction of the first main waveguide 223. The first branch waveguide 225 may remove the fluorescent light 312, which has been reflected from the first dichroic mirror 226, by discharging the fluorescent light 312 to the outside of the first cladding block 222.

The first dichroic mirror 226 may be provided within the first main waveguide 223 adjacent to the first branch waveguide 225. The first dichroic mirror 226 may allow the excitation light 212 to be transmitted therethrough to the fluorescence generating device 400, and reflect the fluorescent light 312 of the fluorescence generating device 400 to the first branch waveguide 225.

Figure 3:
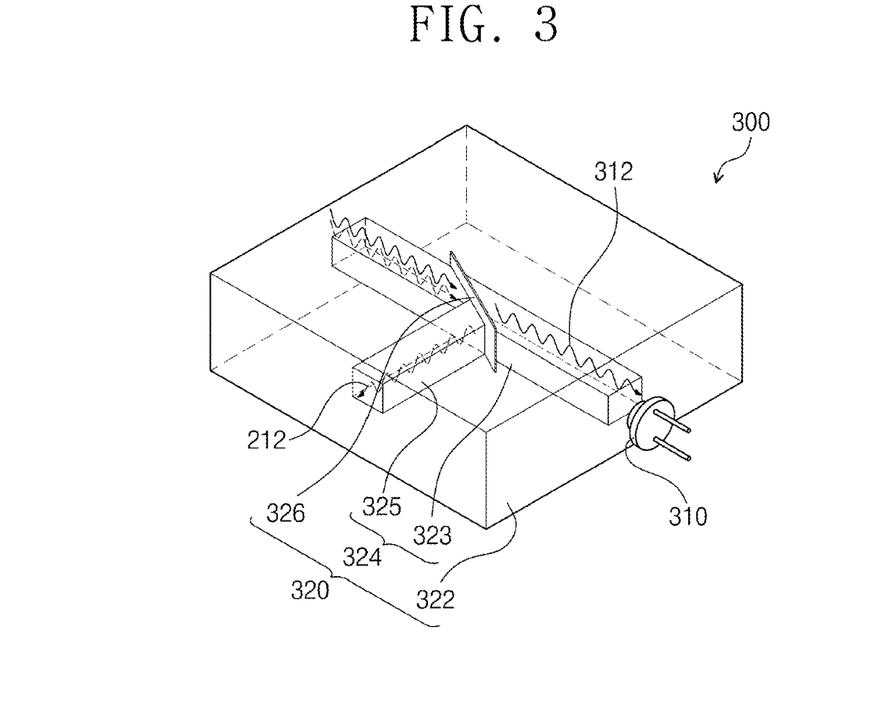
FIG. 3 is a perspective view showing an example of a detection device of FIG. 1.

FIG. 3 shows an example of the detection device 300 of FIG. 1.

Referring to FIG. 3, the detection device 300 may include a photo-detector 310 and a second optical transmission block 320.

The photo-detector 310 may detect the fluorescent light 312. For example, the photo-detector 310 may include a photo diode. On the other hand, the photo-detector 310 may include a CMOS sensor or a CCD sensor, but the embodiment of the inventive concept is not limited thereto.

The second optical transmission block 320 may be provided between the photo-detector 310 and the fluorescence generating device 400. The second optical transmission block 320 may deliver the fluorescent light 312 to the photo-detector 310. The second optical transmission block 320 may reduce noise in the fluorescent light 312 by removing the excitation light 212. As one example, the second optical transmission block 320 may include a second cladding block 322, a second buried waveguide 324, and a second dichroic mirror 326.

The second cladding block 322 may be provided between the photo-detector 310 and the fluorescence generating device 400. The second cladding block 322 may include the same material as the first cladding block 222. For example, the second cladding block 322 may include a silicon oxide or a transparent polymer.

The second buried waveguide 324 may be provided within the second cladding block 322. The second buried waveguide 324 may be connected between the photo-detector 310 and the fluorescence generating device 400. The second buried waveguide 324 may have a refractive index greater than a refractive index of the second cladding block 322. For example, the second buried waveguide 324 may include silicon. The second buried waveguide 324 may deliver the fluorescent light 312 to the photo-detector 310. As one example, the second buried waveguide 324 may include a second main waveguide 323 and a second branch waveguide 325. The second main waveguide 323 may extend from one side of the second cladding block 322 to the other side thereof. The second main waveguide 323 may connect the photo-detector 310 to the fluorescence generating device 400. The second main waveguide 323 may deliver the fluorescent light 312 to the photo-detector 310. The second branch waveguide 325 may be branched from the second main waveguide 323. The second branch waveguide 325 may remove the excitation light 212, which has been reflected from the second dichroic mirror 326, by discharging the excitation light 212 to the outside of the second cladding block 322.

The second dichroic mirror 326 may be provided within the second main waveguide 323 adjacent to the second branch waveguide 325. The second dichroic mirror 326 allows the fluorescent light 312 to be transmitted therethrough to the photo-detector 310, and may reduce noise in the fluorescent light 312 by reflecting the excitation light 212 to the second branch waveguide 325.

Figure 4:
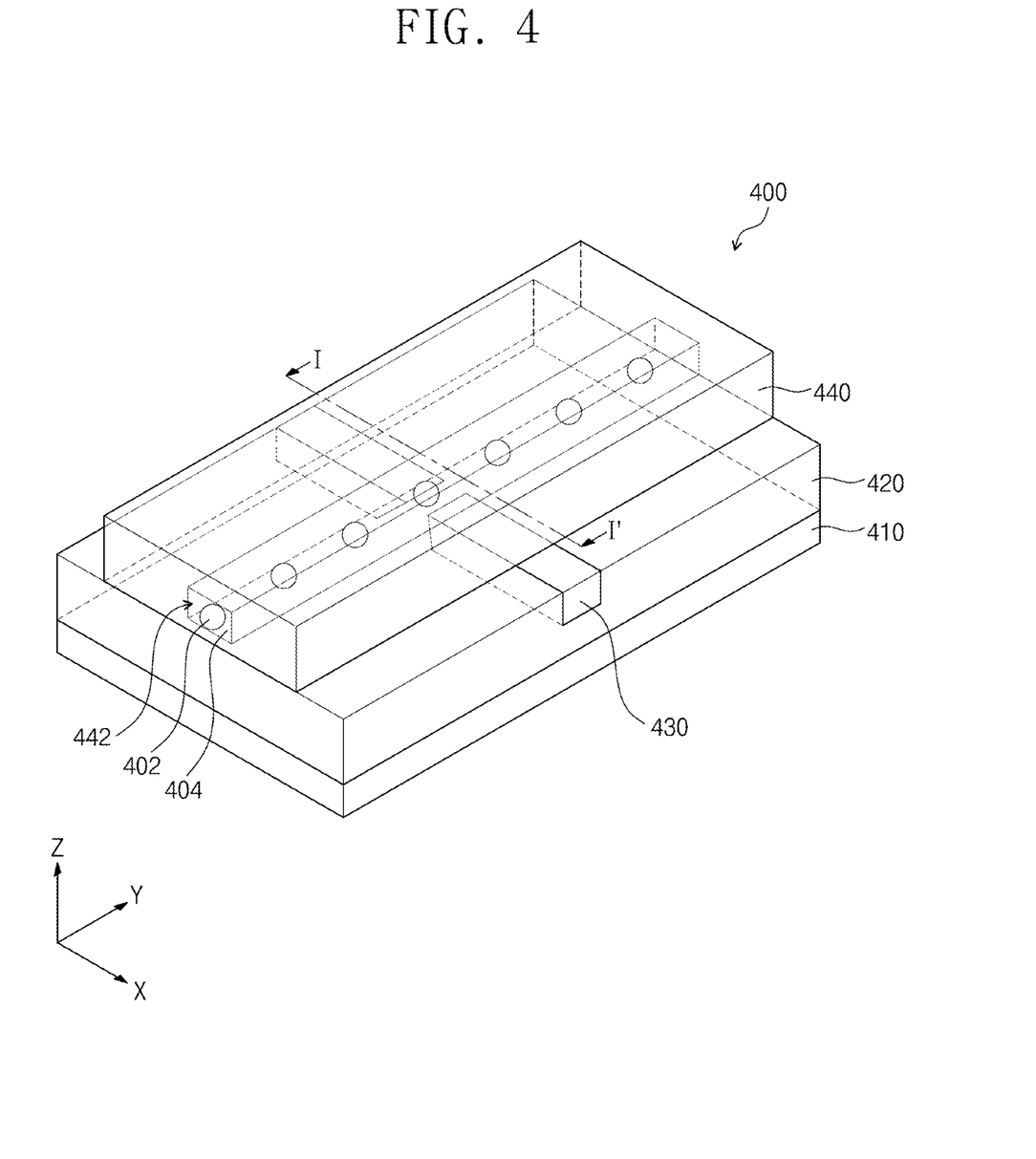
FIG. 4 is a perspective view showing an example of a fluorescence generating device of FIG. 1.
Figure 5:
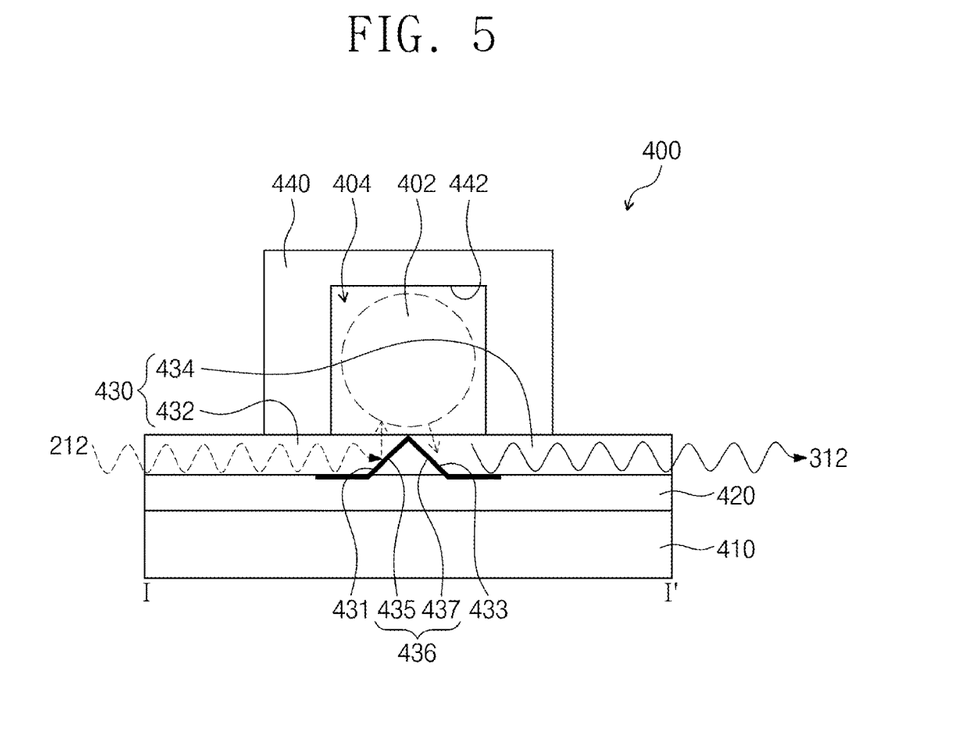
FIG. 5 is a cross-sectional view taken along line I-I' of FIG. 4.

FIG. 4 shows an example of the fluorescence generating device 400 of FIG. 1. FIG. 5 shows a view taken along line I-I' of FIG. 4.

Referring to FIGS. 4 and 5, the fluorescence generating device 400 may be a channel fluorescence device. As one example, the fluorescence generating device 400 may include a substrate 410, a clad layer 420, an optical waveguide 430, and a fluid chip 440.

The substrate 410 may include a silicon substrate. The substrate 410 may include III-V group semiconductor substrate or printed circuit board, but the embodiment of the inventive concept is not limited thereto.

The clad layer 420 may be provided on the substrate 410. The clad layer 420 may include a silicon oxide. On the other hand, the clad layer 420 may include a silicon nitride, but the embodiment of the inventive concept is not limited thereto.

The optical waveguide 430 may be provided within the clad layer 420. The optical waveguide 430 may have a refractive index higher than a refractive index of the clad layer 420. The optical waveguide 430 may be arranged in a first direction X. As one example, the optical waveguide 430 may be a ridge-type waveguide. On the other hand, the optical waveguide 430 may be a buried waveguide, but the embodiment of the inventive concept is not limited thereto. The top surface of the optical waveguide 430 may be coplanar with the top surface of the clad layer 420. The optical waveguide 430 may include an input waveguide 432, an output waveguide 434, and a reflection layer 436.

The input waveguide 432 may be provided within one side of the clad layer 420. The input waveguide 432 may provide the excitation light 212 to the liquid drop 402 within the fluid chip 440. The input waveguide 432 may have an input inclined surface 431. The input inclined surface 431 may be provided below the liquid drop 402. The input inclined surface 431 may be slantingly arranged between the top surface and the bottom surface of the input waveguide 432. The top surface of the input waveguide 432 may be longer than the bottom surface thereof. The input inclined surface 431 may reflect the excitation light 212 to the liquid drop 402 within the fluid chip 440.

The output waveguide 434 may be provided within the other side of the clad layer 420. The output waveguide 434 may output the fluorescent light 312 of the liquid drop 402 to the detection device 300. The output waveguide 434 may have an output inclined surface 433. The output inclined surface 433 may be provided below the liquid drop 402. The output inclined surface 433 may be slantingly arranged between the top surface and the bottom surface. The top surface of output input waveguide 434 may be longer than the bottom surface thereof. The output inclined surface 433 may reflect the fluorescent light 312 of the liquid drop 402 to the detection device 300.

The reflection layer 436 may be provided between the clad layer 420 and the optical waveguide 430. The reflection layer 436 may be provided between the input inclined surface 431 and the output inclined surface 433. The reflection layer 436 may reflect the excitation light 212 and the fluorescent light 312. The reflection layer 436 may include aluminum. On the other hand, the reflection layer 436 may include gold, silver, or tungsten, but the embodiment of the inventive concept is not limited thereto. As one example, the reflection layer 436 may include an input reflection layer 435 and an output reflection layer 437. The input reflection layer 435 may be provided below the input inclined surface 431. The input reflection layer 435 may reflect the excitation light 212. The output reflection layer 437 may be provided below the output inclined surface 433. The output reflection layer 437 may reflect the fluorescent light 312.

The fluid chip 440 may be provided on the clad layer 420, the input waveguide 432, and the output waveguide 434. The fluid chip 440 may have a micro fluid channel 442. The micro fluid channel 442 may be arranged in a second direction Y. The micro fluid channel 442 may be provided above the input inclined surface 431 and the output inclined surface 433. The micro fluid channel 442 may be in contact with the top surfaces of the input waveguide 432, the output waveguide 434, and the clad layer 420. The micro fluid channel 442 may store and/or accommodate liquid drops 402 and an oil 404. The liquid drops 402 and the oil 404 within the micro fluid channel 442 may flow in the second direction Y. Each of the liquid drops 402 may be provided within the oil 404. The liquid drop 402 may be a liquid drop for PCR. The liquid drop 402 may include deoxyribonucleotide in which DNA, RNA, a primer, a medium, a DNA polymerase, a buffer solution, and phosphoric acid are coupled to each other, but the embodiment of the inventive concept is not limited thereto. The DNA may account for about 0.1% to about 1% of the liquid drop 402. The deoxyribonucleotide, in which the RNA, the primer, the medium, the DNA polymerase, and phosphoric acid are coupled to each other, may account for about 0.9% to about 4% of the liquid drop 402. The buffer solution may include de-ionized water and account for about 95% to about 99% of the liquid drop 402. The liquid drop 402 may have a spherical shape within the oil 404 due to repulsive force and/or surface tension. Although not illustrated, a liquid drop forming device may provide the liquid drop 402 and the oil 404 into the micro fluid channel 442.

Meanwhile, the input waveguide 432 may be separable from the output waveguide 434. The input inclined surface 431 and the input reflection layer 435 reflect the excitation light 212 to the micro fluid channel 442, and thus may minimize or prevent the inflow of the excitation light 212 into the output waveguide 434. A noise in the excitation light 212 may be reduced. When the excitation light 212 is provided to the liquid drop 402, the liquid drop 402 may absorb the excitation light 212 and generate the fluorescent light 312. The fluorescent light 312 within the micro fluid channel 442 may be provided to the output waveguide 434 and the input waveguide 432. The fluorescent light 312 within the output waveguide 434 may be reflected from the output inclined surface 433 and the output reflection layer 437 and then provided to the photo-detector 310. The fluorescent light 312 within the input waveguide 432 may be removed by the input inclined surface 431, the first main waveguide 223, the first dichroic mirror 226, and the first branch waveguide 225.

Thus, the fluorescence generating device 400 may increase the fluorescence detection efficiency by propagating the excitation light 212 and the fluorescent light 312 through the input inclined surface 431, the output inclined surface 433, the input reflection layer 435, and the output reflection layer 437 in opposite directions.

Figure 6:
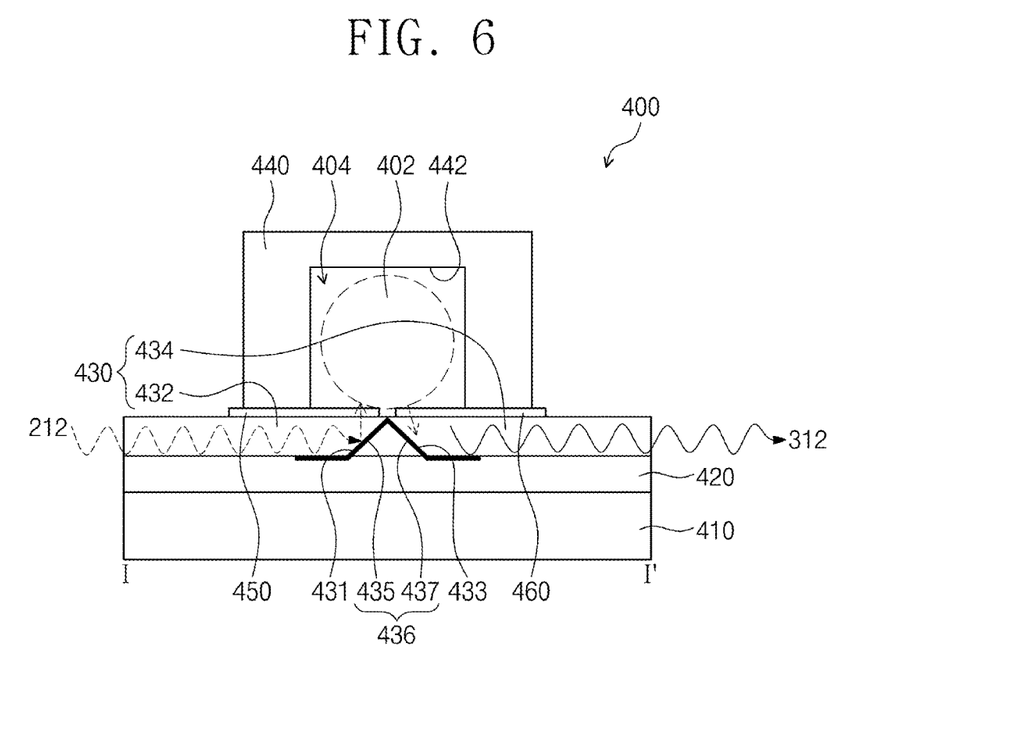
FIG. 6 is a cross-sectional view showing another example of the fluorescence generating device of FIG. 4.

FIG. 6 shows another example of the fluorescence generating device 400 of FIG. 4.

Referring to FIG. 6, the fluorescence generating device 400 may further include a fluorescent light filter 450 and an excitation light filter 460.

The fluorescent light filter 450 may be provided on an input waveguide 432. The fluorescent light filter 450 may be provided between the input waveguide 432 and a liquid drop 402 within a micro fluid channel 442. The fluorescent light filter 450 may include blue film or acrylic. The fluorescent light filter 450 may allow excitation light 212 having blue color to be transmitted therethrough to the input waveguide 432 and remove fluorescent light 312 having green color (a wavelength of about 520 nm). The fluorescent light filter 450 removes the fluorescent light 312 to be provided to the input waveguide 432 and may protect an exciting light source 210.

The excitation light filter 460 may be provided on an output waveguide 434. The excitation light filter 460 may be provided between the output waveguide 434 and the liquid drop 402 within the micro fluid channel 442. The excitation light filter 460 may include green film or acrylic. The excitation light filter 460 may allow the fluorescent light 312 having green color to be transmitted therethrough to the output waveguide 434 and remove the excitation light 212 having blue color. Also, the excitation light filter 460 may include film or acrylic having fluorescent color, but the embodiment of the inventive concept is not limited thereto.

A substrate 410, a clad layer 420, an optical waveguide 430, and a fluid chip 440 may be configured to be the same as those of FIG. 5.

Figure 7:
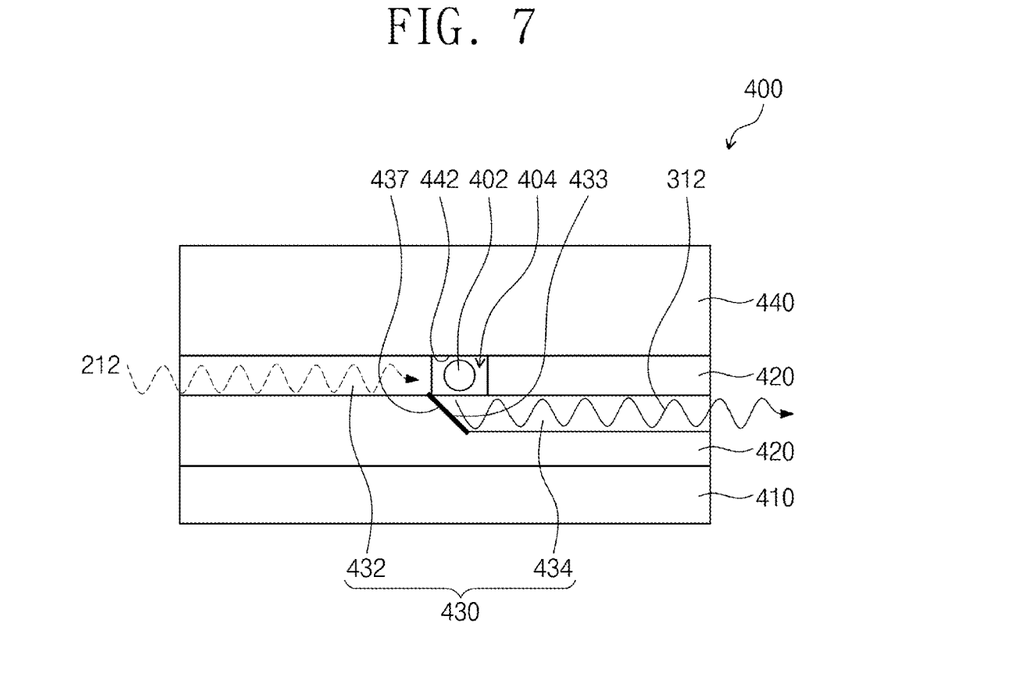
FIG. 7 is a cross-sectional view showing another example of the fluorescence generating device of FIG. 4.

FIG. 7 shows another example of the fluorescence generating device 400 of FIG. 4.

Referring to FIG. 7, an input waveguide 432 of the fluorescence generating device 400 may be connected to a side wall on one side of a micro fluid channel 442. The input waveguide 432 may provide excitation light 212 to a liquid drop 402 near the side wall of the micro fluid channel 442 without the input inclined surface 431 and the input reflection layer 435 of FIG. 5. The liquid drop 402 may absorb the excitation light 212 and discharge fluorescent light 312. The fluorescent light 312 may be provided to an output waveguide 434 below the micro fluid channel 442. The output inclined surface 433 and the output reflection layer 437 may reflect the fluorescent light 312 to the photo-detector 310.

A clad layer 420 may be disposed at a side wall on the other side of the micro fluid channel 442 opposite to the input waveguide 432. The clad layer 420 may be disposed between the output waveguide 434 and a fluid chip 440. The clad layer 420 may have a refractive index less than a refractive index of the output waveguide 434. Fluorescent light 312 within the clad layer 420 may be provided to the output waveguide 434.

A substrate 410 may be configured to be the same as that of FIG. 5.

Figure 8:
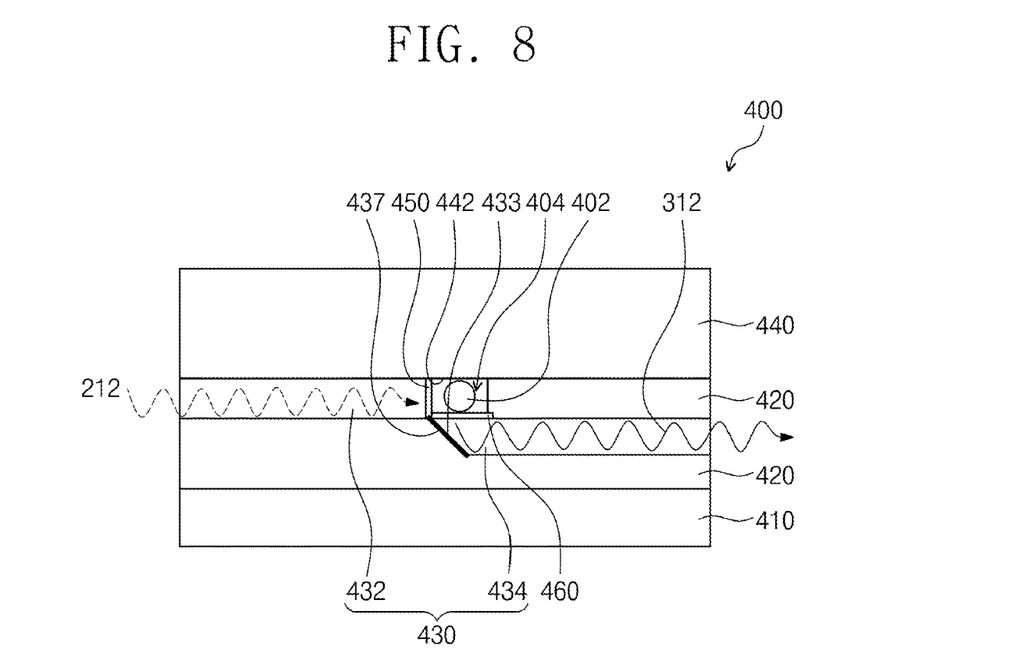
FIG. 8 is a cross-sectional view showing another example of the fluorescence generating device of FIG. 4.

FIG. 8 shows another example of the fluorescence generating device 400 of FIG. 4.

Referring to FIG. 8, a fluorescent light filter 450 and an excitation light filter 460 of a fluorescence generating device 400 may be arranged in an L-shape within a micro fluid channel 442.

The fluorescent light filter 450 may be provided at a side wall on one side of the micro fluid channel 442. An input waveguide 432 may be connected to the side wall on the one side of the micro fluid channel 442. The fluorescent light filter 450 may be provided at an end of the input waveguide 432. The fluorescent light filter 450 may be provided between a liquid drop 402 within the micro fluid channel 442 and the input waveguide 432. The fluorescent light filter 450 may allow excitation light 212 to be transmitted therethrough to the liquid drop 402, and may remove fluorescent light 312 of the liquid drop 402.

The excitation light filter 460 may be provided on the bottom of the micro fluid channel 442 above an output inclined surface 433. The excitation light filter 460 may allow the fluorescent light 312 to be transmitted therethrough into an output waveguide 434 and remove the excitation light 212.

A substrate 410, a clad layer 420, an optical waveguide 430, and a fluid chip 440 may be configured to be the same as those of FIG. 7.

Figure 9:
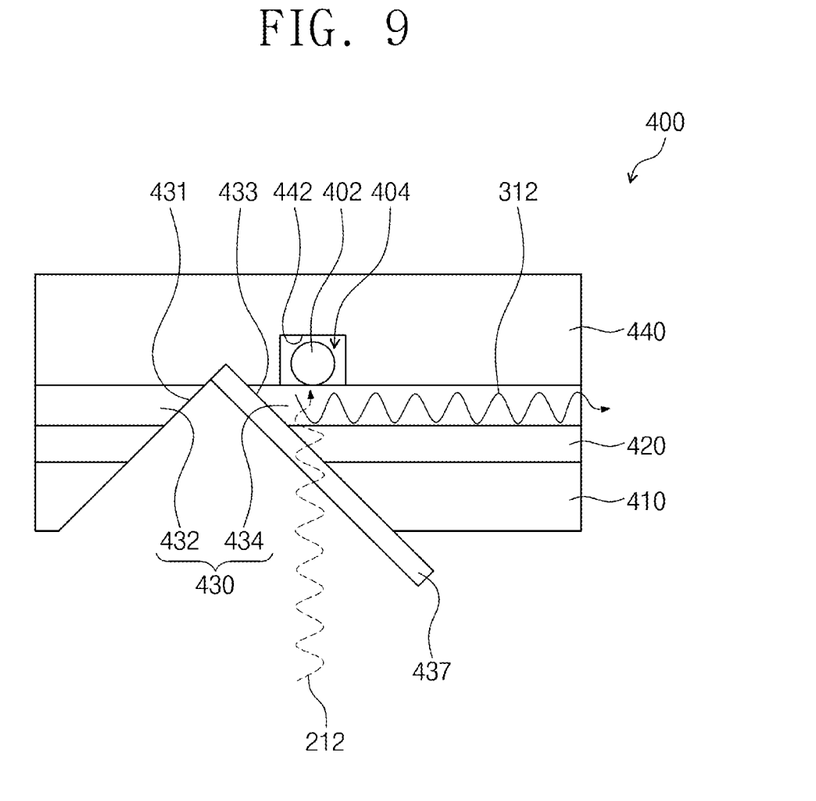
FIG. 9 is a cross-sectional view showing another example of the fluorescence generating device of FIG. 4.

FIG. 9 shows another example of the fluorescence generating device 400 of FIG. 4.

Referring to FIG. 9, an output reflection layer 437 of a fluorescence generating device 400 may allow excitation light 212 to be transmitted therethrough to an output waveguide 434 and a liquid drop 402 and may reflect fluorescent light 312 into the output waveguide 434. The output reflection layer 437 may include a dichroic filter or a dichroic mirror. A micro fluid channel 442 of a fluid chip 440 may be disposed spaced apart from an input waveguide 432 and disposed on the output waveguide 434. Although not illustrated, an exciting light source 210 may be provided below the output reflection layer 437. The excitation light 212 may be transmitted through the output reflection layer 437 and provided to the liquid drop 402. The fluorescent light 312 of the liquid drop 402 may be provided into the output waveguide 434 through the output reflection layer 437 and an output inclined surface 433.

A substrate 410 and a clad layer 420 may be configured to be the same as those of FIG. 5.

Figure 10:
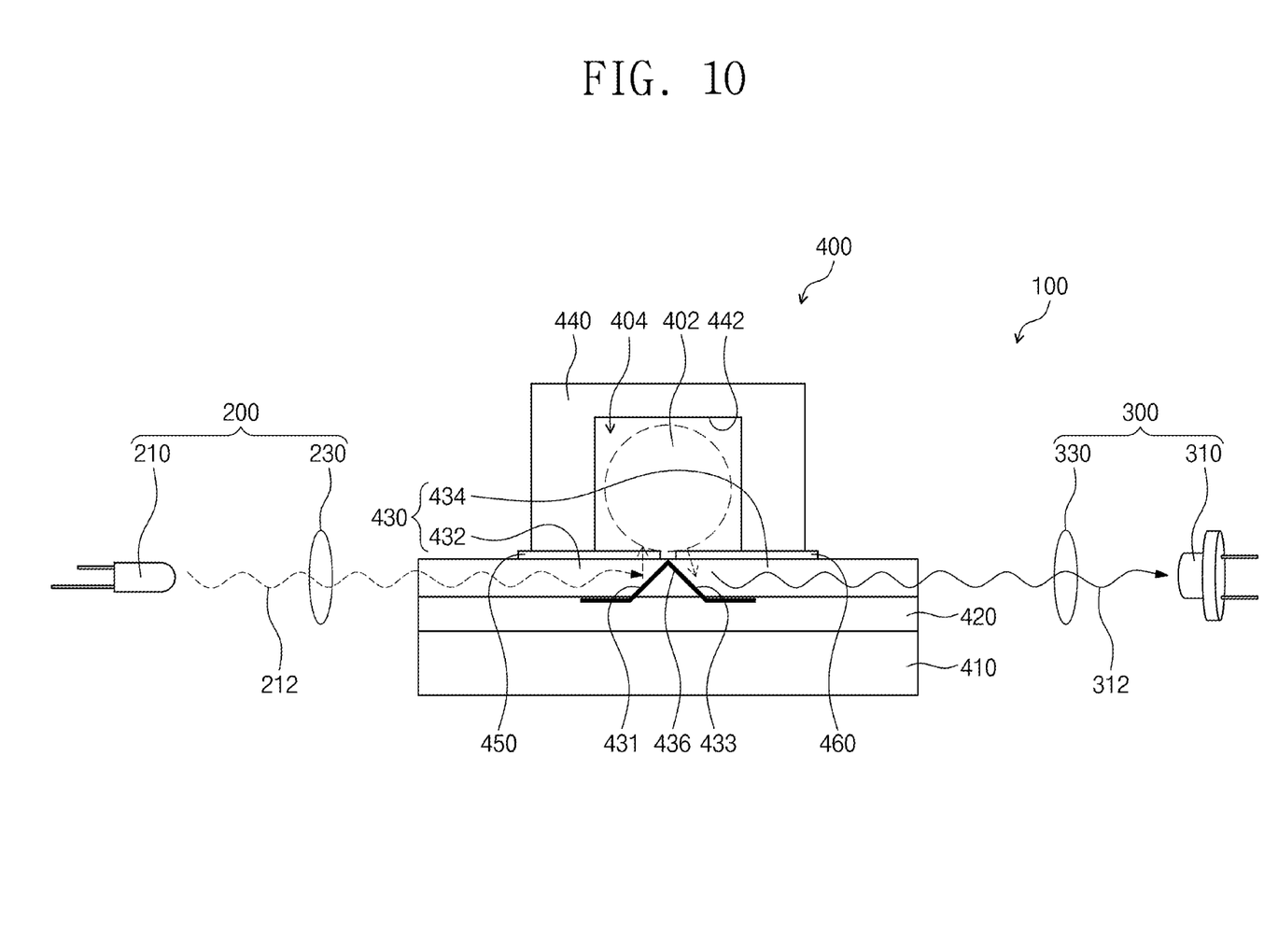
FIG. 10 is a cross-sectional view showing an example of a digital PCR analysis system according to an embodiment of the inventive concept.

FIG. 10 shows an example of a digital PCR analysis system 100 according to an embodiment of the inventive concept.

Referring to FIG. 10, a light source device 200 and a detection device 300 of a digital PCR analysis system 100 may include a first lens 230 and a second lens 330, respectively. The first lens 230 and the second lens 330 may correspond to the first optical transmission block 220 and the second optical transmission block 320 of FIGS. 1 to 3, respectively.

The first lens 230 may be provided between an exciting light source 210 and a fluorescence generating device 400. The first lens 230 may include a convex lens. The first lens 230 may focus excitation light 212 on an input waveguide 432.

The second lens 330 may be provided between the fluorescence generating device 400 and a photo-detector 310. The second lens 330 may include a convex lens. The second lens 330 may focus fluorescent light 312 on the photo-detector 310.

The fluorescence generating device 400 may be configured to be the same as that of FIG. 5.

Figure 11:
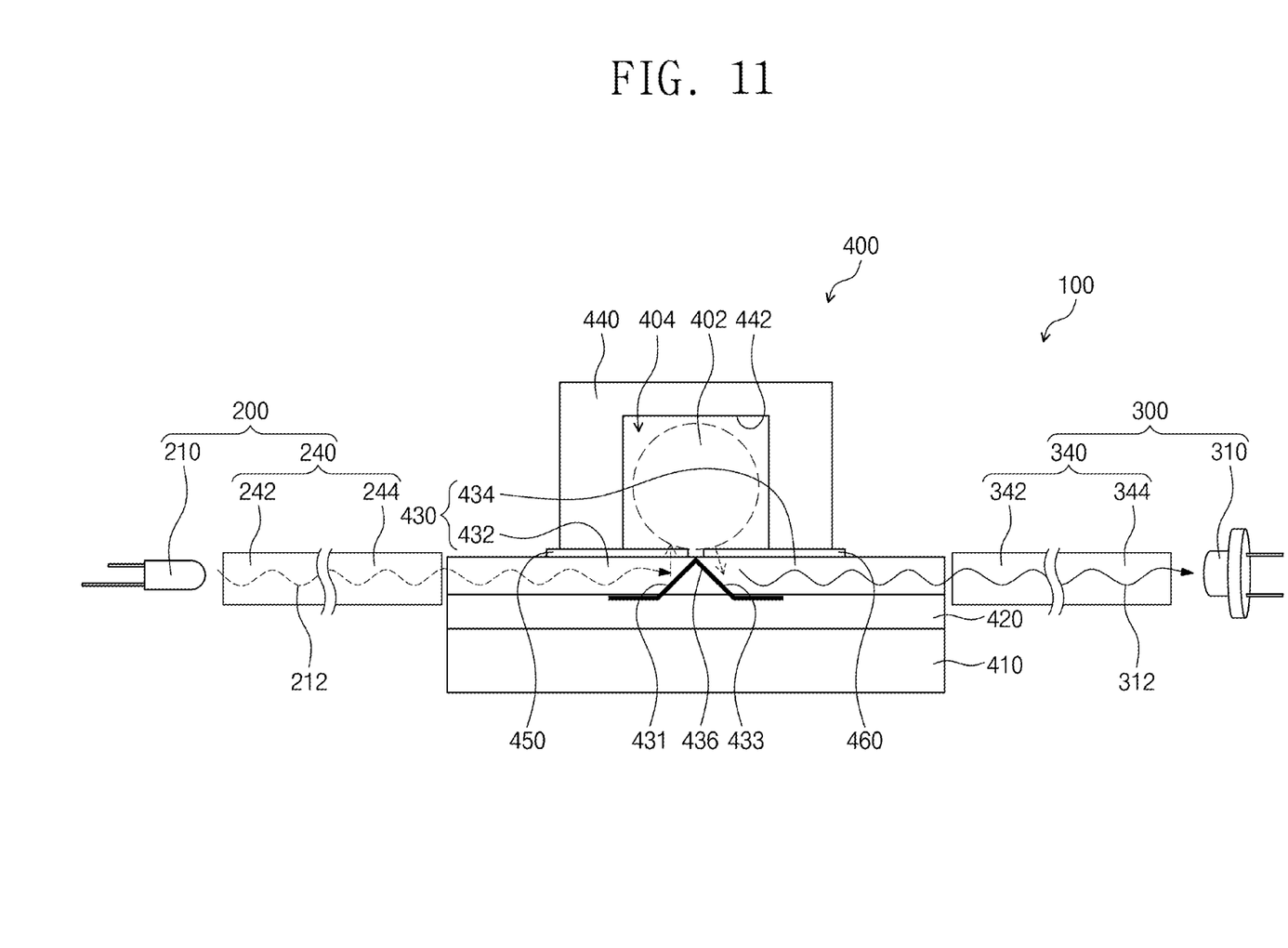
FIG. 11 is a cross-sectional view showing an example of a digital PCR analysis system according to an embodiment of the inventive concept.

FIG. 11 shows an example of a digital PCR analysis system 100 according to an embodiment of the inventive concept.

Referring to FIG. 11, a light source device 200 and a detection device 300 of a digital PCR analysis system 100 may include a first optical fiber 240 and a second optical fiber 340, respectively. The first optical fiber 240 and the second optical fiber 340 may correspond to the first lens 230 and the second lens 330 of FIG. 10, respectively.

The first optical fiber 240 may be provided between an exciting light source 210 and a fluorescence generating device 400. The first optical fiber 240 may deliver excitation light 212 to an input waveguide 432. The first optical fiber 240 may change an optical path of the excitation light 212. For example, the first optical fiber 240 may include a first cladding 242 and a first core 244. The first cladding 242 may surround the first core 244. The first core 244 may be provided within the first cladding 242. The first core 244 may have a refractive index higher than a refractive index of the first cladding 242. The first core 244 may deliver the excitation light 212 between the exciting light source 210 and the fluorescence generating device 400.

The second optical fiber 340 may be provided between the fluorescence generating device 400 and a photo-detector 310. The optical fiber 340 may deliver fluorescent light 312 to the photo-detector 310. The second optical fiber 340 may change an optical path of the fluorescent light 312. For example, the second optical fiber 340 may include a second cladding 342 and a second core 344. The second cladding 342 may surround the second core 344. The second core 344 may be provided within the second cladding 342. The second core 344 may deliver the fluorescent light 312 between the fluorescence generating device 400 and the photo-detector 310.

As described above, the fluorescence generating device according to the embodiment of the inventive concept increases the fluorescence detection efficiency by propagating the excitation light and the fluorescent light through the input inclined surface, the output inclined surface, the input reflection layer, and the output reflection layer in opposite directions.

The foregoing description is about detailed examples for practicing the inventive concept. The present disclosure includes not only the above-described embodiments but also simply changed or easily modified embodiments. In addition, the present disclosure may include techniques which may be easily modified and practiced by using the embodiments described above.

What is claimed is:

1. A fluorescence generating device comprising:
   a clad layer on a substrate;
   an optical waveguide disposed within the clad layer and arranged in a first direction; and
   a housing disposed on the optical waveguide and the clad layer, the housing having a micro fluid channel that extends in a second direction crossing the first direction,
   wherein the optical waveguide comprises:
   an input waveguide which is provided within one side of the clad layer and provides excitation light to a liquid drop within the micro fluid channel to generate fluorescent light; and
   an output waveguide which is provided within the other side of the clad layer, the output waveguide having an output inclined surface disposed between the micro fluid channel and the clad layer to reflect the fluorescent light,
wherein the input waveguide is disposed below the micro fluid channel, the input waveguide having an input inclined surface disposed between the micro fluid channel and the clad layer to reflect the excitation light to the liquid drop within the micro fluid channel, and
wherein the fluorescence generating device further comprises a reflection layer which is disposed between the input and output inclined surfaces and the clad layer.

2. The fluorescence generating device of claim 1, wherein the reflection layer comprises:
an input reflection layer below the input inclined surface; and
an output reflection layer below the output inclined surface.

3. The fluorescence generating device of claim 2, wherein the output reflection layer comprises a dichroic filter.

4. The fluorescence generating device of claim 1, further comprising a fluorescent light filter which is provided within the micro fluid channel above the input inclined surface.

5. The fluorescence generating device of claim 4, wherein the input waveguide is connected to a side wall of the micro fluid channel.

6. The fluorescence generating device of claim 5, wherein the fluorescent light filter is provided at an end of the input waveguide that is in contact with the side wall of the micro fluid channel.

7. The fluorescence generating device of claim 1, further comprising an excitation light filter which is provided within the micro fluid channel above the output inclined surface.

8. The fluorescence generating device of claim 1, wherein the optical waveguide comprises a ridge-type waveguide.

9. A fluorescence generating device comprising:
a clad layer on a substrate;
an input waveguide provided on one side of the clad layer, the input waveguide having an input inclined surface;
an output waveguide provided on the other side of the clad layer, the output waveguide having an output inclined surface adjacent to the input inclined surface;
a reflection layer provided between the input and output inclined surfaces and the clad layer;
a fluid chip disposed above the input inclined surface and the output inclined surface, the fluid chip having a micro fluid channel that accommodates oil and a liquid drop within the oil;
an excitation light filter disposed within the micro fluid channel above the output inclined surface to remove excitation light provided to the liquid drop; and
a fluorescent light filter disposed within the micro fluid channel adjacent to the input waveguide to remove fluorescent light discharged from the liquid drop by the excitation light.

10. The fluorescence generating device of claim 9, wherein the input waveguide is connected to a side wall on one side of the micro fluid channel.

11. The fluorescence generating device of claim 10, wherein the excitation light filter and the fluorescent light filter are disposed in an L-shape.

12. The fluorescence generating device of claim 10, wherein the clad layer is provided at a side wall on the other side of the micro fluid channel.

13. A digital PCR analysis system comprising:
a light source device including an exciting light source configured to generate excitation light;
a fluorescence generating device configured to receive the excitation light to generate fluorescent light of a liquid drop; and
a detection device provided with a photo-detector configured to detect the fluorescent light,
wherein the fluorescence generating device comprises:
a clad layer on a substrate;
an optical waveguide disposed within the clad layer and arranged in a first direction; and
a housing disposed on the optical waveguide and the clad layer, the hosing having a micro fluid channel that extends in a second direction crossing the first direction,
wherein the optical waveguide comprises:
an input waveguide provided within one side of the clad layer, the input waveguide providing the excitation light to the liquid drop within the micro fluid channel to generate the fluorescent light; and
an output waveguide provided within the other side of the clad layer, the output waveguide having an output inclined surface that is disposed between the micro fluid channel and the clad layer to reflect the fluorescent light,
wherein the input waveguide is disposed below the micro fluid channel, the input waveguide having an input inclined surface disposed between the micro fluid channel and the clad layer to reflect the excitation light to the liquid drop within the micro fluid channel, and
wherein the fluorescence generating device further comprises a reflection layer which is disposed between the input and output inclined surfaces and the clad layer.

14. The digital PCR analysis system of claim 13, wherein the light source device further comprises a first optical transmission block provided between the exciting light source and the fluorescence generating device,
wherein the first optical transmission block comprises:
a first cladding block;
a first buried waveguide disposed within the first cladding block, the first buried waveguide delivering the excitation light to the fluorescence generating device; and
a first dichroic mirror provided in the first buried waveguide, the first dichroic mirror transmitting the excitation light and reflecting the fluorescent light.

15. The digital PCR analysis system of claim 13, wherein the detection device further comprises a second optical transmission block provided between the photo-detector and the fluorescence generating device,
wherein the second optical transmission block comprises:
a second cladding block;
a second buried waveguide disposed within the second cladding block, the second buried waveguide providing the fluorescent light to the photo-detector; and
a second dichroic mirror provided in the second buried waveguide, the second dichroic mirror transmitting the fluorescent light and reflecting the excitation light.

16. The digital PCR analysis system of claim 13, wherein the light source device further comprises a first lens provided between the exciting light source and the fluorescence generating device, and
the detection device further comprises a second lens between the fluorescence generating device and the photo-detector.

17. The digital PCR analysis system of claim 13, wherein the light source device further comprises a first optical fiber between the exciting light source and the fluorescence generating device, and the detection device further comprises a second optical fiber between the fluorescence generating device and the photo-detector.

* * * * *